Nov. 24, 1936.    W. V. HUKILL    2,061,941

DEVICE FOR MEASURING FLUID VELOCITY

Filed Aug. 22, 1932

WITNESSES

INVENTOR
William V. Hukill

Patented Nov. 24, 1936

2,061,941

UNITED STATES PATENT OFFICE 2,061,941

DEVICE FOR MEASURING FLUID VELOCITY

William V. Hukill, Clarendon, Va.
Dedicated to the free use of the Public

Application August 22, 1932, Serial No. 629,944

3 Claims. (Cl. 73—204)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without payment to me of any royalty thereon.

I hereby dedicate the invention herein described, to the free use of the public, to take effect upon the granting of a patent to me.

This invention relates to a device for measuring fluid velocity, including the velocity of air, other gases and liquids.

In cold storage rooms, refrigerator cars and other places it is often desirable to know the rate of air movement due to natural convection currents. The air movement is sometimes so slow that a mechanical anemometer will either fail to detect it or give erroneous results.

It is often desirable to know the rate of air movement at points not accessible to a person. In these places a mechanical anemometer which required the presence of a person to make readings could not be used.

The rate of air movement in a room or compartment may be affected by the presence of a person. For this reason it is sometimes impossible to get true velocity readings with a mechanical anemometer which requires the presence of a person for making readings.

The object of the present invention is to measure fluid velocities in the range of ordinary convection currents, and to measure air movement of any velocity at remote or inaccessible places.

Figure 1:
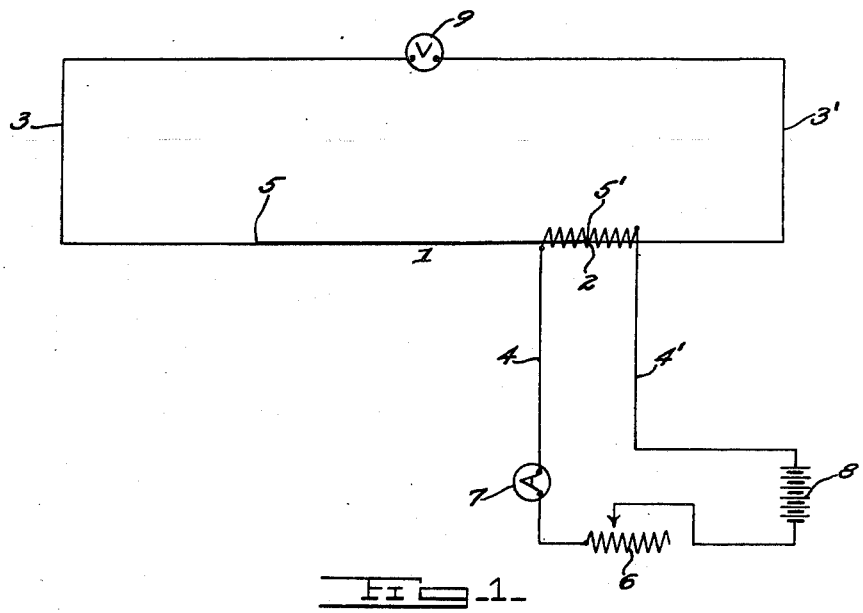
Figure 2:
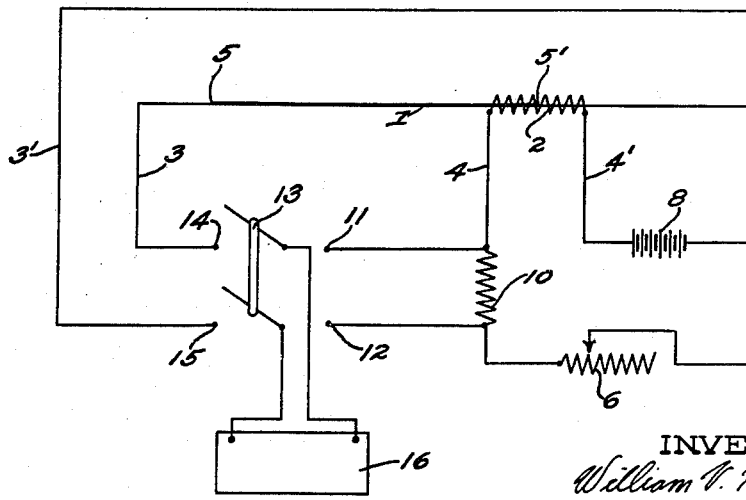

Fig. 1 is a diagram of the device, and Figure 2 is a diagram of a modification. In this diagram, 1 is a wire of a metal or alloy. 3 and 3' are wires of some other metal or alloy having a thermoelectric power differing from that of wire 1. Wires 3 and 3' are joined to wire 1 at junctions 5 and 5' to form a thermocouple. The thermocouple is not supported otherwise than by the wires constituting said thermocouple. The other ends of wires 3 and 3' are connected to the terminals of a voltmeter 9. 2 is a heating element of some metal or alloy of appreciable electrical resistance through which electric current from battery 8 may be passed by means of wires 4 and 4' through ammeter 7 and variable resistance 6. Heating element 2 is closely adjacent to junction 5' and supported thereby, element 2 being wrapped as a coil about junction 5' but is not in electrical contact with it or with wire 1 or 3', said heating element having been coated with a thin layer of nonconducting oxide by heating in an oxidizing flame. When electric current is passed through heating element 2 it is heated and raises the temperature of junction 5'. The amount of heat generated in heating element 2 may be controlled by means of the variable resistance 6. Junction 5 is not heated by the heating element 2 but remains at or nearly at the temperature of the surrounding medium. The difference in temperature between the junctions 5 and 5' will cause an electromotive force between the terminals of wires 3 and 3', the magnitude of this electromotive force depending upon the amount of temperature difference between junctions 5 and 5'. The electromotive force may be measured by means of the voltmeter 9. If junctions 5 and 5' be placed in an air current, the moving air will cool the heated junction 5', the amount of such cooling depending upon the velocity of the air.

By suitable calibrations, the rate of air movement past the device in any location may be determined by the relation between the reading of voltmeter 9 and that of ammeter 7. In practice it has been found convenient to employ a slightly modified arrangement shown in Fig. 2. In this figure the ammeter is replaced by a constant resistance 10 of manganin wire or other metal or alloy having negligible temperature coefficient of resistance. The terminals of the constant resistance 10 are connected to the contacts 11 and 12 at one end of the double pole, double throw switch 13. Wires 3 and 3' are connected to contacts 14 and 15 at other end of switch 13. The center poles of switch 13 are connected to the terminals of a potentiometer 16. By means of switch 13, the potentiometer 16 may be connected either to wires 3 and 3' or to terminals of constant resistance 10. When potentiometer 16 is connected to wires 3 and 3', the potential difference of junctions 5 and 5' may be measured. When connected to terminals of constant resistance 10, the fall of potential through constant resistance 10 may be measured by the same instrument. Since the fall of potential through resistance 10 is proportional to current flowing through the resistance, it follows that this fall of potential is a relative measure of the heating current flowing through heating element 2.

In use wire 1 is placed within the compartment where fluid velocity is to be ascertained as is also heating element 2. Wires 3, 3', 4 and 4', serve as lead in wires.

Where either the term "fluid" or "air" is used it is intended to mean air, other gases and liquids.

Having fully disclosed my invention, I claim:

1. A device for measuring the velocity of flow of fluids comprising a thermocouple, a heating coil wrapped about one junction of said thermocouple and solely supported thereby and being in mechanical and thermal contact but not in electrical contact with said junction, said thermocouple being otherwise free from thermal or mechanical contact with any solid material, means for measuring the electromotive force of the thermocouple, means for supplying electric energy to the heating coil, means for adjusting the energy supplied and means for measuring the amount of energy supplied.

2. A device for measuring the velocity of flow of fluids comprising a thermocouple wholly immersed in the moving fluid, a heating element wrapped as a coil about one junction of said thermocouple and solely supported thereby and being in mechanical and thermal contact but not in electrical contact with said junction, said thermocouple being otherwise free from thermal or mechanical contact with any solid material, means for supplying electric energy to said heating element, means for adjusting the amount of heat supplied, means for measuring the amount of heat supplied and means for measuring the electromotive force of the thermocouple.

3. A device for measuring the velocity of flow of fluids comprising a thermocouple wholly immersed in the moving fluid, a heating coil wrapped about one junction of said thermocouple and solely supported thereby and being in mechanical and thermal contact but not in electrical contact with said junction, said thermocouple being otherwise free from thermal or mechanical contact with any solid material, a source of direct current of electricity for applying energy to said heating coil, means for adjusting the amount of heating curing current and means for measuring the electromotive force of the thermocouple.

WILLIAM V. HUKILL.

CERTIFICATE OF CORRECTION.

Patent No. 2,061,941.　　　　　　　　　　　　　　　November 24, 1936.

WILLIAM V. HUKILL

It is hereby certified that error appears in the printed specification of the above numbered patent requiring correction as follows: Page 2, second column, line 16, claim 3, strike out the syllable "cur-" and insert instead the words and syllable current, means for measuring the amount of heat-; and that the said Letters Patent should be read with this correction therein that the same may conform to the record of the case in the Patent Office.

Signed and sealed this 16th day of February, 1937.

(Seal)　　　　　　　　　　　　　　　　　　　　　　　Henry Van Arsdale
　　　　　　　　　　　　　　　　　　　　　　Acting Commissioner of Patents.